(12) United States Patent
Kimura

(10) Patent No.: US 7,349,464 B2
(45) Date of Patent: Mar. 25, 2008

(54) RECEIVER FOR SPREAD SPECTRUM COMMUNICATION

(75) Inventor: Naoya Kimura, Chiba (JP)

(73) Assignee: Oki Electric Industry Co., Ltd., Tokyo (JP)

(*) Notice: Subject to any disclaimer, the term of this patent is extended or adjusted under 35 U.S.C. 154(b) by 722 days.

(21) Appl. No.: 10/839,159

(22) Filed: May 6, 2004

(65) Prior Publication Data

US 2005/0069025 A1    Mar. 31, 2005

(30) Foreign Application Priority Data

Sep. 30, 2003    (JP)    ............... 2003-340824

(51) Int. Cl.
*H04B 1/707*    (2006.01)
(52) U.S. Cl. .............. 375/152; 375/343; 375/326; 375/147; 375/150
(58) Field of Classification Search ............. 375/152
See application file for complete search history.

(56) References Cited

U.S. PATENT DOCUMENTS

| | | | |
|---|---|---|---|
| 4,017,798 A * | 4/1977 | Gordy et al. ............. | 375/332 |
| 5,361,276 A * | 11/1994 | Subramanian ........... | 375/150 |
| 5,909,462 A * | 6/1999 | Kamerman et al. ...... | 375/147 |
| 5,991,330 A * | 11/1999 | Dahlman et al. ......... | 375/149 |
| 6,266,361 B1 * | 7/2001 | Huang et al. ............ | 375/140 |
| 6,317,454 B1 * | 11/2001 | Mamori .................. | 375/147 |
| 2004/0088609 A1 * | 5/2004 | Eckhardt et al. ........ | 714/700 |

FOREIGN PATENT DOCUMENTS

| | | |
|---|---|---|
| JP | 7-312571 | 11/1995 |
| JP | 9-107310 | 4/1997 |

OTHER PUBLICATIONS

"A coherent spread-spectrum RAKE-receiver with maximum-likelihood frequency estimation" Fawer, Urs; Communications, 1992. ICC 92, Conference record, SUPERCOMM/ICC '92, Discovering a New World of Communications. IEEE International Conference on.*

(Continued)

*Primary Examiner*—Shuwang Liu
*Assistant Examiner*—Michael R Neff
(74) *Attorney, Agent, or Firm*—Nixon Peabody LLP; Donald R. Studebaker

(57) ABSTRACT

A receiver includes a channel-matched-filter for outputting a Rake-combining result from a digital spread spectrum signal; a carrier recovery circuit which removes an offset of a carrier wave from the combining result; a correlation circuit which detects correlation; a symbol timing detection circuit which extracts a symbol from the correlation; a symbol determination circuit which regenerates data from the symbol; a framer circuit which discriminates a frame configuration; and a symbol timing recovery circuit which generates a timing phase for each of symbol timings. The channel-matched-filter performs multi-phasing compensation and, in accordance with a timing phase from the symbol timing recovery circuit, performs synchronization tracking.

11 Claims, 10 Drawing Sheets

OTHER PUBLICATIONS

"CDMA code synchronization using segmented matched filter with accumulation and best match selection" Persson, Ben; MILCOM 2002. Proceedingsvol. 2, Oct. 7-10, 2002 pp. 976-981 vol. 2.*

Floyd M. Gardner "A BPSK/QPSK Timing-Error Detector for Sampled Receivers", (IEEE Transactions on Communications, vol. Com-34, No. 5, pp. 423-429, May 1986).

Floyd M. Gardner "Interpolation in Digital Modems Part I Fundamentals", (IEEE Transactions on Communications, vol. 41, No. 3, Mar. 1993).

Lars Erup, et al. "Interpolation in Digital Modems Part II Implementation and Performance" (IEEE Transactions on Communications, vol. 41, No. 3, Mar. 1993).

* cited by examiner

FIG. 3

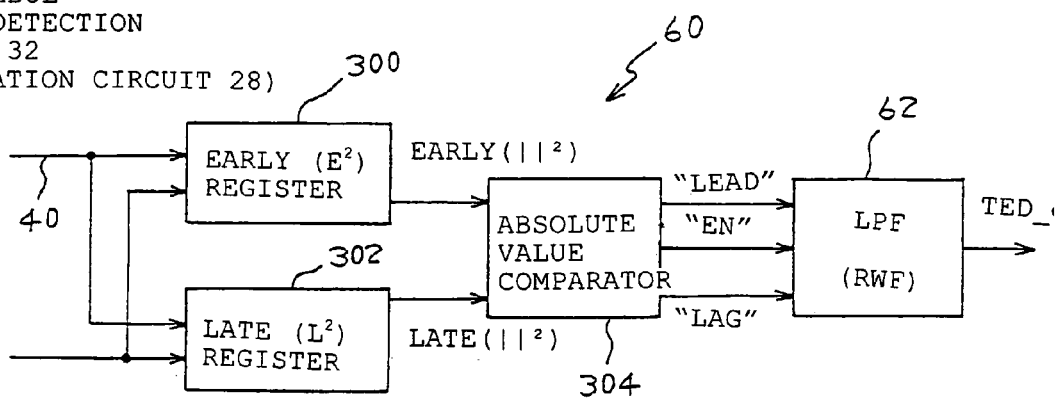

FROM SYMBOL
TIMING DETECTION
CIRCUIT 32
(CORRELATION CIRCUIT 28)

FROM CONTROL CIRCUIT 70
(SYMBOL TIMING)

FIG. 4

| INPUT | LEAD | LAG | EN |
|---|---|---|---|
| EARLY($\|\|^2$)>LATE($\|\|^2$) AND EARLY($\|\|^2$)<ON TIME($\|\|^2$) | 1 | 0 | 0 |
| EARLY($\|\|^2$)<LATE($\|\|^2$) AND LATE($\|\|^2$)<ON TIME($\|\|^2$) | 0 | 1 | 0 |
| EARLY($\|\|^2$)>LATE($\|\|^2$) AND EARLY($\|\|^2$)>ON TIME($\|\|^2$) | 1 | 0 | 1 |
| EARLY($\|\|^2$)<LATE($\|\|^2$) AND LATE($\|\|^2$)>ON TIME($\|\|^2$) | 0 | 1 | 1 |
| EARLY($\|\|^2$)=LATE($\|\|^2$) | 0 | 0 | 0 |
| NOT CONDITION | 1 | 1 | 0 |

FIG. 11

| φ2 | φ3 | φ4 | c 0 | c 1 | c 2 | c 3 | c 4 | c 5 | c 6 | c 7 | ADDRESS |
|---|---|---|---|---|---|---|---|---|---|---|---|
| +1 | +1 | +1 | +1 | +1 | +1 | -1 | +1 | +1 | -1 | +1 | 0 |
| +1 | +1 | +j | +j | +j | +j | -j | +1 | +1 | -1 | +1 | 1 |
| +1 | +1 | -1 | -1 | -1 | -1 | +1 | +1 | +1 | -1 | +1 | 2 |
| +1 | +1 | -j | -j | -j | -j | +j | +1 | +1 | -1 | +1 | 3 |
| +1 | +j | +1 | +j | +j | +1 | -1 | +j | +j | -1 | +1 | 4 |
| +1 | +j | +j | -1 | -1 | +j | -j | +j | +j | -1 | +1 | 5 |
| +1 | +j | -1 | -j | -j | -1 | +1 | +j | +j | -1 | +1 | 6 |
| +1 | +j | -j | +1 | +1 | -j | +j | +j | +j | -1 | +1 | 7 |
| +1 | -1 | +1 | -1 | -1 | +1 | -1 | -1 | -1 | -1 | +1 | 8 |
| +1 | -1 | +j | -j | -j | +j | -j | -1 | -1 | -1 | +1 | 9 |
| +1 | -1 | -1 | +1 | +1 | +1 | +1 | -1 | -1 | -1 | +1 | 10 |
| +1 | -1 | -j | +j | +j | -j | -j | -1 | -1 | -1 | +1 | 11 |
| +1 | -j | +1 | -j | -j | +1 | -1 | -j | -j | -1 | +1 | 12 |
| +1 | -j | +j | +1 | +1 | +j | -j | -j | -j | -1 | +1 | 13 |
| +1 | -j | -1 | +j | +j | -1 | +1 | -j | -j | -1 | +1 | 14 |
| +1 | -j | -j | -1 | -1 | -j | -j | -j | -j | -j | +1 | 15 |
| +j | +1 | +1 | +j | +1 | +j | -1 | +j | +1 | -j | +1 | 16 |
| +j | +1 | +j | -1 | +j | -1 | -j | +j | +1 | -j | +1 | 17 |
| +j | +1 | -1 | -j | -1 | -j | +1 | +j | +1 | -j | +1 | 18 |
| +j | +1 | -j | +1 | -j | +1 | +j | +j | +1 | -j | +1 | 19 |
| +j | +j | +1 | -1 | +j | +j | -1 | -1 | +j | -j | +1 | 20 |
| +j | +j | +j | -j | -1 | -1 | -j | -1 | +j | -j | +1 | 21 |
| +j | +j | -1 | +1 | -j | -j | +1 | -1 | +j | -j | +1 | 22 |
| +j | +j | -j | +j | +1 | +1 | +j | -1 | +j | -j | +1 | 23 |
| +j | -1 | +1 | -j | -1 | +j | -1 | -j | -1 | -j | +1 | 24 |
| +j | -1 | +j | +1 | -j | -1 | -j | -j | -1 | -j | +1 | 25 |
| +j | -1 | -1 | +j | +1 | -j | +1 | -j | -1 | -j | +1 | 26 |
| +j | -1 | -j | -1 | +j | +1 | +j | -j | -1 | -j | +1 | 27 |
| +j | -j | +1 | +1 | -j | +j | -1 | +1 | -j | -j | +1 | 28 |
| +j | -j | +j | +j | +1 | -1 | -j | +1 | -j | -j | +1 | 29 |
| +j | -j | -1 | -1 | +j | -j | +1 | +1 | -j | -j | +1 | 30 |
| +j | -j | -j | -j | -1 | +1 | +j | +1 | -j | -j | +1 | 31 |

CODEWORDS OF CODEWORD TABLE

FIG.12

| φ2 | φ3 | φ4 | c0 | c1 | c2 | c3 | c4 | c5 | c6 | c7 | ADDRESS |
|---|---|---|---|---|---|---|---|---|---|---|---|
| −1 | +1 | +1 | −1 | +1 | −1 | −1 | −1 | +1 | +1 | +1 | 32 |
| −1 | +1 | +j | −j | +j | −j | −j | −1 | +1 | +1 | +1 | 33 |
| −1 | +1 | −1 | +1 | −1 | +1 | +1 | −1 | +1 | +1 | +1 | 34 |
| −1 | +1 | −j | +j | −j | +j | +j | −1 | +1 | +1 | +1 | 35 |
| −1 | +j | +1 | −j | +j | −1 | −1 | −j | +j | +1 | +1 | 36 |
| −1 | +j | +j | +1 | −1 | −j | −j | −j | +j | +1 | +1 | 37 |
| −1 | +j | −1 | +j | −j | +1 | +1 | −j | +j | +1 | +1 | 38 |
| −1 | +j | −j | −1 | +1 | +j | +j | −j | +j | +1 | +1 | 39 |
| −1 | −1 | +1 | +1 | −1 | −1 | −1 | +1 | −1 | +1 | +1 | 40 |
| −1 | −1 | +j | +j | −j | −j | −j | +1 | −1 | +1 | +1 | 41 |
| −1 | −1 | −1 | −1 | +1 | +1 | +1 | +1 | −1 | +1 | +1 | 42 |
| −1 | −1 | −j | −j | +j | +j | +j | +1 | −1 | +1 | +1 | 43 |
| −1 | −j | +1 | +j | −j | −1 | −1 | +j | −j | +1 | +1 | 44 |
| −1 | −j | +j | −1 | +1 | −j | −j | +j | −j | +1 | +1 | 45 |
| −1 | −j | −1 | −j | +j | +1 | +1 | +j | −j | +1 | +1 | 46 |
| −1 | −j | −j | +1 | −1 | +j | +j | +j | −j | +1 | +1 | 47 |
| −j | +1 | +1 | −j | +1 | −j | −1 | −j | +1 | +j | +1 | 48 |
| −j | +1 | +j | +1 | +j | +1 | −j | −j | +1 | +j | +1 | 49 |
| −j | +1 | −1 | +j | −1 | +j | +1 | −j | +1 | +j | +1 | 50 |
| −j | +1 | −j | −1 | −j | −1 | +j | −j | +1 | +j | +1 | 51 |
| −j | +j | +1 | +1 | +j | −j | −1 | +1 | +j | +j | +1 | 52 |
| −j | +j | +j | +j | −1 | +1 | −j | +1 | +j | +j | +1 | 53 |
| −j | +j | −1 | −1 | −j | +j | +1 | +1 | +j | +j | +1 | 54 |
| −j | +j | −j | −j | +1 | −1 | +j | +1 | +j | +j | +1 | 55 |
| −j | −1 | +1 | +j | −1 | −j | −1 | +j | −1 | +j | +1 | 56 |
| −j | −1 | +j | −1 | −j | +1 | −j | +j | −1 | +j | +1 | 57 |
| −j | −1 | −1 | −j | +1 | +j | +1 | +j | −1 | +j | +1 | 58 |
| −j | −1 | −j | +1 | +j | −1 | +j | +j | −1 | +j | +1 | 59 |
| −j | −j | +1 | −1 | −j | −1 | −1 | −j | +j | +1 | 60 |
| −j | −j | +j | −j | +1 | +1 | −j | −1 | −j | +j | +1 | 61 |
| −j | −j | −1 | +1 | +j | +j | +1 | −1 | −j | +j | +1 | 62 |
| −j | −j | −j | +j | −1 | −1 | +j | −1 | −j | +j | +1 | 63 |

CODEWORDS OF CODEWORD TABLE

RECEIVER FOR SPREAD SPECTRUM COMMUNICATION

BACKGROUND OF THE INVENTION

1. Field of the Invention

The present invention relates to a direct-sequence spread spectrum (SS) communication receiver which is used for wireless LAN or a portable telephone, for example, particularly to a receiver which performs synchronization such as symbol synchronization, code synchronization and clock synchronization and synchronization of propagation path characteristics estimation result which is used in a Rake.

2. Description of the Related Art

An existing receiver for spread spectrum communication systems includes an A/D converter which converts a received analog signal to a digital signal; a down converter; a Rake receiver; and a frequency offset correction device connected to the A/D converter, the frequency offset correction device forming a digital feedback loop so as to change the digital signal in accordance with a frequency correction term signal and thereby to correct a frequency offset of the received signal, as disclosed in, for example, Japanese Patent Application Kokai No. H07-115387 (hereinafter, referred to as "JP-A No. H07-115387").

Furthermore, in the timing error detection in a configuration where the direct-sequence spread spectrum (SS) communication is not used, an early gate algorithm is applied, or an interpolation circuit is applied in a symbol synchronization circuit, as disclosed in "Interpolation in Digital Modems Part I", F. M. Gardner, IEEE TRANSACTIONS ON COMMUNICATIONS, VOL. 41, No.3, MARCH 1993 (hereinafter, referred to as "non-patent literatures 1"); and "Interpolation in Digital Modems Part II", L. Erup, F. M. Gardner and R. A. Harris, IEEE TRANSACTIONS ON COMMUNICATIONS, Vol.41, No.3, MARCH 1993(hereinafter, referred to as "non-patent literatures 2").

Reference can also be had to Japanese Patent Applications Kokai No.H09-107310 and No.H07-312571, and "A BPSK/QPSK Timing-Error Detector for Sampled Receivers", F. M. Gardner, IEEE TRANSACTIONS ON COMMUNICATIONS, VOL.COM-34, No.5, pp.423-429, MAY 1986(hereinafter, referred to as "non-patent literatures 3").

However, in the JP-A No.H07-115387 reference, since a down conversion circuit is applied in a clock synchronization circuit necessary for the signal synchronization, an interface between an RF section and a baseband section is closely coupled, when a constitution of a receiver is roughly divided into the radio-frequency (RF) section and the baseband section. Accordingly, for instance, there is a problem in that, when an LSI for the RF section and an LSI for the baseband section are purchased, it is necessitated to purchase LSI's in combination of products of the same company.

Furthermore, a synchronization circuit such as shown in the non-patent literatures 1 and 2 has a configuration which does not use the direct-sequence spread spectrum communication scheme; accordingly, simply, it could not be applied to the SS communications. For instance, the circuit does not have a configuration which technically satisfies processing of the symbol synchronization, code synchronization and clock synchronization in the same function.

SUMMARY OF THE INVENTION

The present invention intends to overcome such deficiencies and disadvantages in the existing technologies and to provide a receiver which, with an interface between an RF section and a baseband section coupled loosely, overcomes a problem in an increase in a circuit scale and allows carrying out synchronization tracking of the symbol synchronization, code synchronization and clock synchronization.

In the present invention, in order to overcome the above-mentioned disadvantages, in a receiver which receives a direct-sequence spread spectrum signal, the receiver includes foremost stage channel matched filter means connected to an output obtained by converting the spread spectrum signal into a digital received signal, the channel matched filter means having a memory capacity of a clock tracking amount for the symbol synchronization, applying Rake combining to the received signal and outputting Rake combining result; carrier recovery means which is connected to an output of the channel matched filter means and removes an offset of a carrier wave from the Rake combining result; correlation means which is connected to an output of the carrier recovery means and detects the correlation of the spread spectrum communication to the Rake combining result from which the offset of the carrier wave is removed; symbol detection means which extracts a symbol based on correlation result detected by the correlation means; symbol determination means which regenerates data from the symbol extracted in the symbol detection means; frame discrimination means which discriminates a frame configuration from the data regenerated by the symbol determination means; and symbol timing recovery means which calculates a timing error amount for each of symbol timings and outputs a timing phase corresponding to the timing error amount to the channel matched filter means; wherein the channel matched filter means compensate multi-phasing to the received signal in accordance with a first feedback from the symbol detection means and carry out symbol synchronization, code synchronization and clock synchronization to the received signal in accordance with a timing phase supplied by a second feedback from the symbol timing recovery means; and the carrier recovery means compensate the frequency offset of the carrier wave from the Rake combining result in accordance with a third feedback from the symbol detection means.

In this instance, the symbol timing recovery means may include timing error detection means which calculates a timing error amount for each of symbol timings; loop filter means which smoothes the timing error amount on a time axis and outputs a smoothed value as a control amount; and divider means which, based on the control amount from the loop filter means, generates a timing phase which is used for the symbol synchronization, the code synchronization and the clock synchronization and output the timing phase to the channel matched filer means.

In this instance, the timing error detection means may include an early register and a late register, each of which, with correlation powers detected by the correlation means inputted, retains absolute values of the correlation powers at a symbol synchronization timing and a plurality of points of ±1/n (n: variable) symbol synchronization timings; and absolute value comparison means which compares outputs of the early resister and the late register and generates an error amount for reducing an error in displacement detection of the symbol synchronization timing phase; wherein the loop filter means are well to be formed of a random walk filter and smooth an output of the absolute value comparison means on a time axis.

Furthermore, the channel matched filter means may include a first FIFO memory which has a memory capacity of a clock tracking amount $\pm\Delta f$ and the number of taps of a tracking range N of an estimated multi-path delay; a first propagation path characteristics estimation result register which have a forward and backward shift function which is constituted of a propagation path characteristics estimation result of a tracking range N of estimated multi-path delay and all zeros in taps before and after that and have the number of taps of a memory capacity of $\pm\Delta f$; first multiplication means which multiplies the respective tap outputs of the first FIFO memory and the first propagation path characteristics estimation result register; and first addition means which applies moving average calculation to multiplied results of the first multiplication means; wherein in accordance with the timing phase supplied from the symbol timing recovery means, a retention value of the first propagation path characteristics estimation result register is well to be shifted fore and aft with respect to an initial tap phase to carry out the Rake combining, and further the symbol synchronization, code synchronization and clock synchronization are well to be carried out.

Furthermore, the channel matched filter means may include a second FIFO memory which has a memory capacity of a clock tracking amount $\pm\Delta f$ and the number of taps within a tracking range N of estimated multi-path delay; a second propagation path characteristics estimation result register of a tracking range N of estimated multi-path delay; a multiplexer which has the number of taps of a memory capacity of $N\pm\Delta f$, selects values for N phases from retention values of the second FIFO memory to input, followed by outputting the inputted value; second multiplication means which multiplies the respective tap outputs of the multiplexer and the second propagation path characteristics estimation result register; and second addition means which applies moving average processing to multiplied results of the second multiplication means; wherein in accordance with the timing phase supplied from the symbol timing recovery means, the multiplexer is allowed selecting and outputting retention values of the second FIFO memory by N phase portions, the second multiplication means multiply the output of the multiplexer and tap output of the second propagation path characteristics estimation result register to carry out the Rake combining, and furthermore the symbol synchronization, the code synchronization and the clock synchronization are well to be carried out.

Still furthermore, the correlation means may include a fast Walsh transformation circuit which is connected to an output of the carrier recovery means and calculates a correlation result at a symbol synchronization timing; a codeword table which calculates a codeword from the correlation result; and a correlation circuit which calculates, with the codeword, correlation power results at a plurality of points of $\pm 1/n$ (n: variable) symbol synchronization timing phases; wherein correlation power amounts at a symbol synchronization timing and a plurality of points of $\pm 1/n$ (n: variable) symbol synchronization timing phases are well to be calculated.

Furthermore, in the present invention, in order to overcome the above-mentioned disadvantages, in a receiver which receives a direct-sequence spread spectrum signal, the receiver includes channel matched filter means which, with a received signal that is digitally converted from a spread spectrum signal inputted, applies Rake combining and outputs a Rake combining result; symbol timing recovery means that are connected to an output of the channel matched filter means and apply symbol synchronization, code synchronization and clock synchronization to the Rake combining result; carrier recovery means which is connected to an output of the symbol timing recovery means and removes a frequency offset of a carrier wave from the Rake combining result; correlation means which is connected an output of the carrier recovery means and detects the correlation of the spread spectrum communication to the Rake combining result from which the frequency offset of the carrier wave is removed; symbol detection means which extracts a symbol based on the correlation result detected by the correlation means; symbol determination means which regenerates data from the symbol extracted in the symbol detection means; and a frame discrimination means which discriminates a frame configuration from the data regenerated by the symbol determination means; wherein the channel matched filter means compensate multi-phasing to a received signal in accordance with a first feedback from the symbol detection means; a symbol timing recovery circuit, in accordance with a second feedback control from the timing detection means, generates a timing error amount, interpolate the Rake combining results with a control amount corresponding to the timing error amount, and output an optimum estimation Rake combining output result data to the carrier recovery means; and the carrier recovery means, in accordance with a third feedback from the symbol detection means, compensates the frequency offset of the carrier wave.

In this instance, a symbol timing recovery circuit may include timing error detection means which generates a timing error amount. The timing error detection means are well to include a first early register and a first late register, each of which, with the correlation powers detected by the correlation means inputted, retain absolute values of the correlation powers at a plurality of points of the symbol synchronization timing phase which is by $\pm 1/n$ (n: variable) away from the symbol synchronization timing, and carry out the in-phase addition between a plurality of symbols; a first addition means which adds an output of the first early register and an output of the first late register to calculate an error amount; and a first register which retains an error amount for each two symbols and generates a timing error amount.

Furthermore, the symbol timing recovery circuit may include timing error detection means which generates a timing error amount. The timing error detection means are well to include a second early register and a second late register, each of which, with the correlation powers detected by the correlation means inputted, retains absolute values of the correlation powers at a symbol synchronization timing and a plurality of points of $\pm 1/n$ (n: variable) symbol synchronization timing phases, and calculates a moving average between the plurality of symbols; second addition means which adds an output of the second early register and an output of the second late register and calculates an error amount; and a second register which retains error amounts for each two symbols and generates a timing error amount.

Still furthermore, the correlation means may include a fast Walsh transformation circuit which is connected to an output of the carrier recovery means and calculates a correlation result at a symbol synchronization timing; a codeword table which calculates a codeword from the correlation result; and a correlation circuit which calculates, with the codeword, correlation power results at a plurality of points of $\pm 1/n$ (n: variable) symbol synchronization timing phases; wherein correlation power amounts at the symbol synchronization timing and a plurality of points of $\pm 1/n$ (n: variable) symbol synchronization timing phases are well to be calculated.

Furthermore, the invention, in order to overcome the above-mentioned disadvantages, includes a channel matched filter that on the basis of the timing phase signal performs multi-phasing compensation of a digitalized radio frequency signal and thereby generates a Rake combining result; a carrier recovery circuit which removes a frequency offset of the Rake combining result; a correlation circuit which implements correlation processing of the Rake combining result from which the frequency offset is removed and generates a correlation result; a symbol timing detection circuit which extracts a symbol from the correlation result; and a symbol timing recovery circuit which generates a timing phase signal with the extracted symbol.

According to the present invention, by dispersingly distributing processing during the symbol synchronization, the code synchronization and the clock synchronization in a baseband processor, with the present receiver, the synchronization tracking of the symbol synchronization, the code synchronization and the clock synchronization can be carried out. Accordingly, since the coupling with the RF processing section can be made loose, a choice of options or alternatives in selecting LSI's which constitute the RF processing section can be expanded.

Furthermore, when an interface between the RF processing section and the baseband section of the device is loosely coupled and the correlation means are simplified, a memory amount can be reduced and there is no need of providing a plurality of fast Walsh transformation circuits; accordingly, a problem of an increase in a circuit scale can be solved.

Still furthermore, the channel matched filter means perform multi-phasing compensation and the carrier recovery means input an output of which frequency offset of a carrier wave is compensated to the correlation means; accordingly, the correlation power can be calculated from signals of which multi-phasing, the interference between chips and the interference between symbols are compensated or removed, and synchronization processing results based on high accuracy correlation results can be obtained.

BRIEF DESCRIPTION OF THE DRAWINGS

FIG. 3 is a block diagram showing an example of internal configuration of a timing error detection (TED) circuit shown in FIG. 2;

FIG. 4 is a diagram showing output values of comparison results in an absolute value comparator shown in FIG. 3;

FIG. 11 is a diagram showing codewords of a codeword table in the correlation processor shown in FIG. 10; and FIG. 12 is a diagram showing codewords in a codeword table in the correlation processor shown in FIG. 10.

DETAILED DESCRIPTION OF THE INVENTION

Embodiments of a receiver according to the present invention will be described in detail with reference to the attached drawings.

Figure 1:
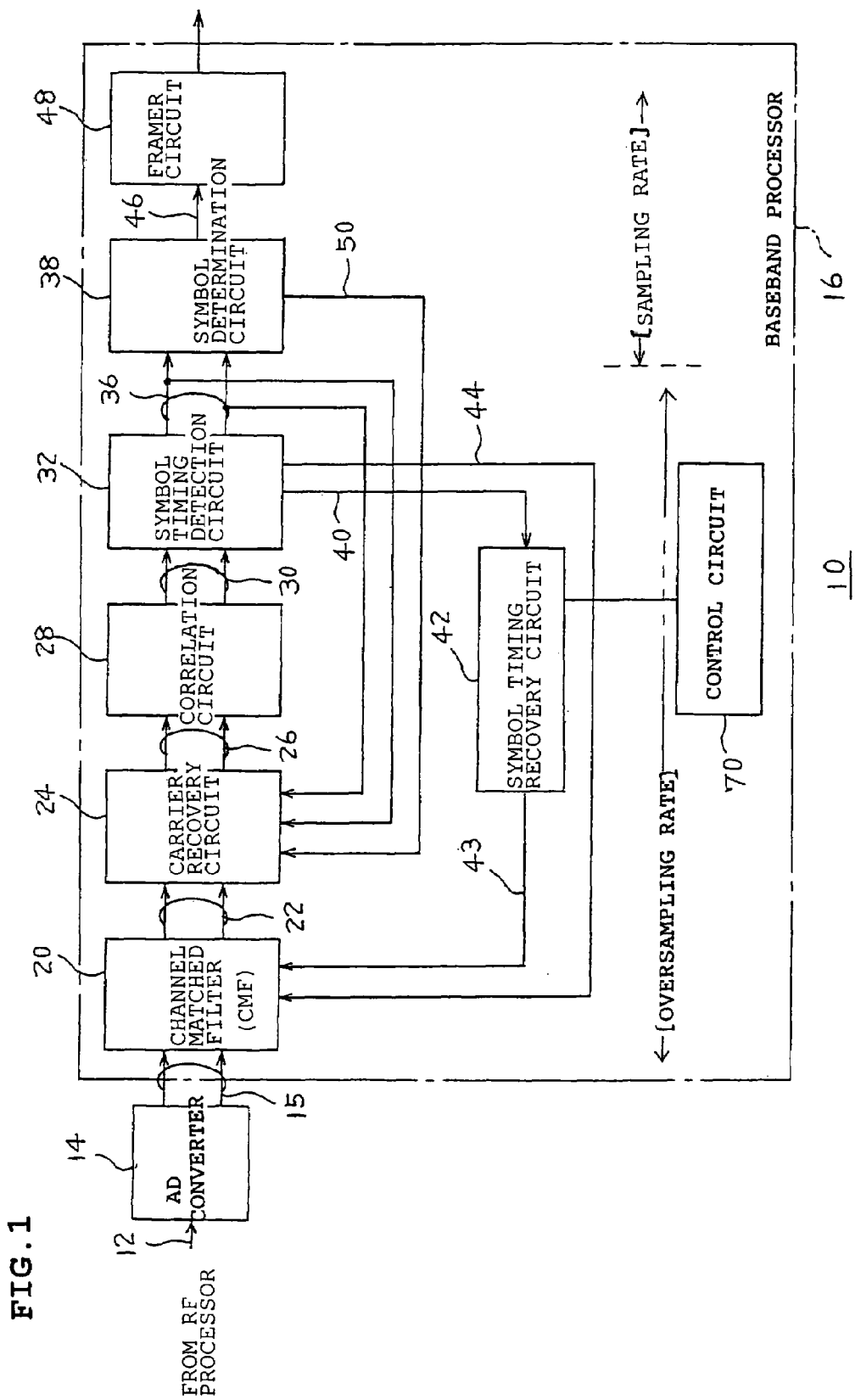
FIG. 1 is a block diagram showing an example of a configuration of a baseband processing section of a receiver to which the present invention is applied.

In FIG. 1, there is shown a block diagram of a receiver 10 for a direct-sequence spread spectrum communication (SS communication). The receiver 10 includes an analog/digital (AD) converter 14 having an input terminal 12 to which a received analog signal is input. The received analog signal is output from an RF processor. The AD converter 14 includes an output terminal 15 which is connected to a channel matched filter (CMF) circuit 20 in a baseband processor 16. The baseband processor 16 is a processor which performs synchronization such as symbol synchronization to an input signal to regenerate data. The baseband processor 16 performs symbol synchronization processing to an input signal to detect a symbol.

The channel matched filter (CMF) 20 includes a FIFO register. The channel matched filter (CMF) 20 performs Rake combining to an input signal to output a Rake combining output to an output terminal 22. In more detail, the CMF circuit 20 includes a FIFO memory having the number of taps of a memory capacity of a clock tracking amount; a register which retains propagation path characteristics estimation result in a tracking range of estimated multi-path delay; and an operational circuit which performs a moving average operation of multiplication results of the respective taps and the propagation path characteristics estimation results and performs, based on the propagation path characteristics estimation results, combining at the maximum ratio for each chip; wherein a transversal filter is formed with the FIFO memory as a delay circuit. The CMF circuit 20 disposed at the foremost stage thereof performs multi-phasing compensation.

An output 22 of the CMF circuit 20 is connected to a carrier recovery circuit 24, the carrier recovery circuit 24 being a carrier wave reproduction circuit which performs, to the Rake combining output result from the CMF circuit 20, carrier recovery operation which removes a frequency offset of a carrier wave by use of a rotator.

An output 26 of the carrier recovery circuit 24 is connected to a correlation circuit 28, and the correlation circuit 28 applies correlation processing to the carrier recovered Rake combining results to detect correlations for the direct-sequence spread spectrum communication (SS communication). An output of the correlation circuit 28 is connected to a symbol timing detection circuit 32. The correlation circuit 28 of the embodiment supplies a detected correlation power through the symbol timing detection circuit 32 to a later-described symbol timing recovery circuit 42.

The symbol timing detection circuit 32 is a detection circuit which extracts symbols from the correlation results of the correlation circuit 28. One output 36 of the symbol timing detection circuit 32 is connected to a symbol determination circuit 38 which regenerates data from extracted symbols and is feedback-connected to the carrier recovery circuit 24 which performs symbol synchronization. Furthermore, another output 40 of the symbol timing detection circuit 32 which relays the output 30 of the correlation circuit 28 is connected to a symbol timing recovery circuit 42. An output 43 of the symbol timing recovery circuit 42 is feedback-connected to the CMF circuit 20. Still another output 44 of the symbol timing detection circuit 32 is directly feedback-connected to the CMF circuit 20. One output 46 of the symbol determination circuit 38 is connected to a framer circuit 48 which discriminates, for instance, a PLCP (Physical Layer Convergence Protocol) format frame configuration from input data, and the other output 50 is feedback-connected to the CMF circuit 20.

In the embodiment, the symbol timing detection circuit 32 is feedback connected through the symbol timing recovery circuit 42 to the CMF circuit 20, and thereby a synchronization circuit which performs the synchronization tracking of the symbol synchronization, the code synchronization, the clock synchronization and the propagation path characteristics estimation results which are used in the rake is formed.

Figure 2:
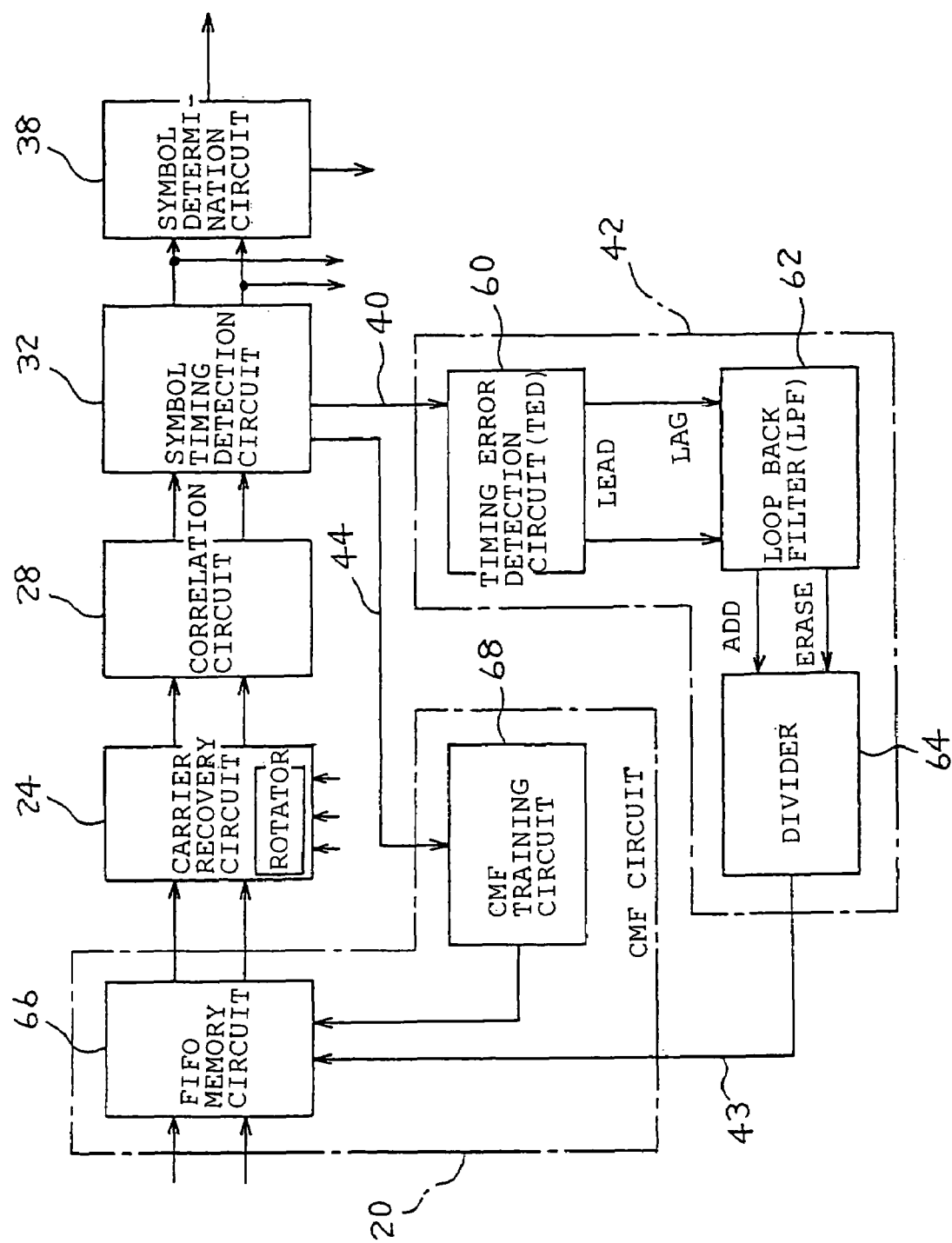
FIG. 2 is a block diagram showing an example of internal configurations of a channel matched filter (CMF) and a symbol timing recovery circuit in an embodiment shown in FIG. 1 and a connection state thereof.

The symbol timing recovery circuit 42, as an example of the configuration thereof is shown in FIG. 2, includes a timing error detection (TED) circuit 60 which, with the correlation results which are outputted from the correlation circuit 28 and supplied through the symbol timing detection circuit 32 inputted to an input 40, detects timing errors thereof; a loop back filter (LPF) circuit 62 connected to an output of the TED circuit 60; and a divider circuit 64 connected to an output of the LPF circuit 62, an output 43 of the divider circuit 64 being connected to the CMF circuit 20.

The TED circuit 60 calculates a timing error amount for each of symbol timings and the LPF circuit 62 smoothes error amounts detected by the TED circuit 60 on a time axis. The divider circuit 64 divides with error amounts from the LPF circuit 62 as a control amount, generates timing phases which are used in the symbol synchronization, the code synchronization and the clock synchronization and supplies to the CMF circuit 20.

The CMF circuit 20 includes a FIFO memory circuit 66 and a CMF training circuit 68 which observes a fixed pattern for an output 44 of the symbol timing detection circuit 32 at a training sequence and applies adaptive automatic equalization. The FIFO memory circuit 66, owing to timing phase supplied from the divider circuit 64, shifts the estimation result of the propagation path characteristics fore and aft relative to an initial tap phase to perform the synchronization tracking of the estimation of the propagation path characteristics which is used in the rake, and thereby performs the symbol synchronization, the code synchronization and the clock synchronization tracking.

An example of configuration of the TED circuit 60 is shown in FIG. 3. An output of the correlation circuit 28 is inputted through the symbol timing detection circuit 32 into an early register 300 and a late register 302 in the TED circuit 60. The early register 300 and the late register 302 input absolute values of the correlation powers at a symbol synchronization timing (ONTIMING) and a plurality of points of ±1/n (n: variable) symbol synchronization timings supplied from a control circuit 70 (FIG. 1), retain and output retention values thereof to an absolute value comparator 304.

The absolute value comparator 304, which compares amounts of errors and thereby reduces errors of displacement detection of the symbol synchronization timing phase, compares and calculates outputs of squared absolute values outputted from the early register 300 and the late register 302, and outputs, as shown in, for instance, FIG. 4, LEAD, LAG and EN in accordance with comparison results.

An output of the absolute value comparator 304 is connected to the LPF 62 which forms a digital loop filter. In the present example of configuration, in the LPF 62, a random walk filter (RWF) is applied, and the RWF, which includes a back protection two stage control circuit (not shown) and a 2N two-way counter which reversibly counts twice values of variable jitter absorption amount N, smoothes values on a time axis and thereby suppresses the jitter low. Thus, the TED circuit 60 in the embodiment forms a binary quantized phase comparator with early and late gate type protection function.

Next, an example of configuration of the channel matched filter (CMF) 20 will be explained in detail with reference to FIG. 5. An output 15 of the AD converter 14 (FIG. 1) is connected to a FIFO 500 which has a memory capacity of a clock tracking amount ±Δf and is constituted of the number of taps of a tracking range N of estimated multi-path delay. Furthermore, an output 43 of the symbol timing recovery circuit 42 (FIG. 1) is connected to a propagation path characteristics estimation result register 502 which has a memory capacity of estimation results of the propagation path characteristics of a tracking range N of the estimated multi-path delay and has the number of taps of ±Δf having a fore and aft shift function constituted of all zeros in taps before and after that.

Outputs of the respective taps of the FIFO 500 and the estimation result register of the propagation path characteristics 502 each are connected to multipliers 510 which multiply corresponding tap outputs and performs weight calculation, and outputs of multiplication results of the multipliers 510 each are connected to an adder 520 which performs moving average calculation. Outputs of the adder 520 constitute an output of the CMF circuit 20 and are connected to the carrier recovery circuit 24.

Thus constituted CMF circuit 20, owing to a timing phase ("add", "erase") output 43 supplied from the symbol timing recovery circuit 42, shifts a retention value of the propagation path characteristics estimation result register 502 fore and aft with respect to an initial tap position, and thereby performs the synchronization of the propagation path characteristics estimation results which are used in the Rake, and synchronization tracking such as the symbol synchronization, the code synchronization and the clock synchronization.

Figure 6:
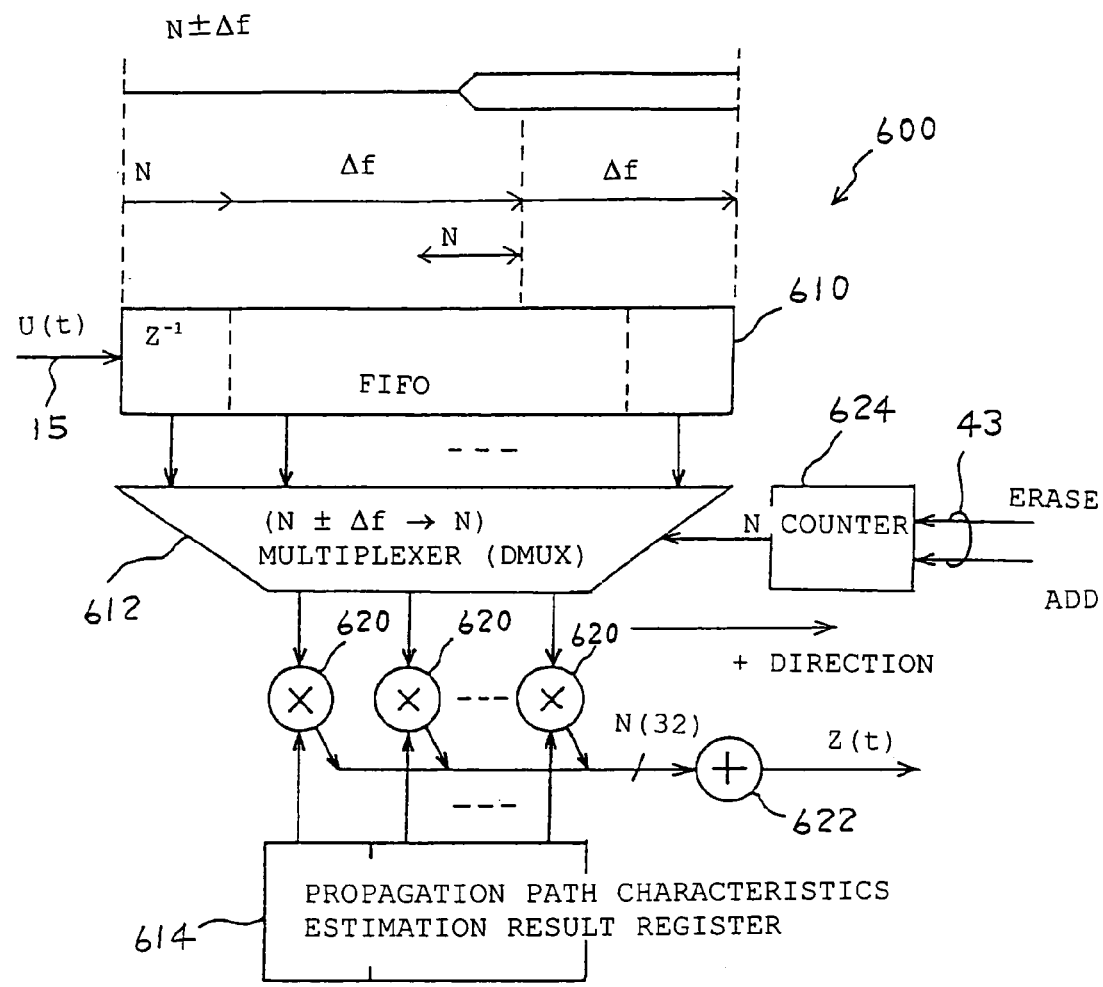
FIG. 6 is a block diagram showing another example of configuration of a channel matched filter (CMF)

Another example of configuration of the channel matched filter (CMF) circuit 20 is shown in FIG. 6. As is shown in the drawing, a channel matched filter (CMF) circuit 600 according to the example of configuration includes a FIFO 610 connected to an output 15 of the AD converter 14 (FIG. 1) and constituted of the number of taps having a memory capacity of N±Δf; a multiplexer (MUX) circuit 612 which selects N phase portions from the respective taps of the FIFO 610 and outputs; a propagation path characteristics estimation result register 614 of a tracking range N of estimated multi-path delay; multipliers 620 each connected to the outputs of the MUX circuit 612 and the corresponding taps of the propagation path characteristics estimation result register 614; an adder 622 which implements moving average calculation of multiplied result outputs of the respective multipliers 620; and an N counter 624 of symbol timing N where an increment when count is carried out according to a timing phase ("add", "erase") output 43 supplied from the divider circuit 64 (FIG. 2) of the symbol timing recovery circuit 42 (FIG. 1) is assigned to +1, +2 or zero (0).

In the example of configuration, an output of the N counter 624 is connected to the DMUX circuit 612 and the timing phase output 43 from the divider circuit 64 is inputted to the N counter 624, thereby a reload phase of the propagation path characteristics estimation result register 614 is shifted relatively fore and aft to perform a synchronization operation.

When an operation of the baseband processor 16 of the receiver 10 is explained with such configuration, an output of an external AD converter 14 is rake combined in the channel matched filter (CMF) 20 disposed at the foremost stage, and thereby a Rake combining result in which the multi-phasing due to multi-path propagation is compensated in accordance with the feedback from the symbol timing detection circuit 32 can be obtained. Subsequently, a frequency offset of the carrier wave is removed in the carrier recovery circuit 24. Thus carrier recovered Rake combining results are correlation processed in the correlation circuit 28. Based on the correlation results, symbols are extracted in the symbol timing detection circuit 32, after data is regenerated from the extracted symbols in the symbol determination circuit 38, the framer circuit 48 discriminates a frame configuration from the regenerated data and outputs frame signal.

Together with this, the symbol timing recovery circuit 42 and the channel matched filter circuit 20 carry out the synchronization tracking of the symbol synchronization, the code synchronization and the clock synchronization.

In the symbol timing recovery circuit 42, symbol timings obtained by synchronization acquisition in the symbol timing detection circuit 32, magnitudes of power levels, polarities and timings of timings before and after the symbol timings are input. The timing error detection circuit 60 (FIG. 2) calculates, based on these, a timing error amount for each of the symbol timings, and the loop back filter circuit 62 of a random walk filter suppresses jitter low and smoothes error amounts on a time axis.

In the timing error detection circuit 60, with correlation result outputs of the correlation circuit 28 and the symbol timings from the control circuit 70, outputs of the early register 300 and the late register 302 shown in FIG. 3 are compared in the absolute value comparator 304, and thereby error amounts for reducing errors in the displacement detection of the symbol synchronization timing phase are generated.

An error amount smoothed on a time axis is divided by the divider circuit 64 and thereby timing phases which are used in the symbol synchronization, the code synchronization and the clock synchronization are generated.

The timing phases are fed-back to the channel matched filter (CMF) circuit 20. The propagation path characteristics estimation results of the channel matched filter circuit are shifted, by the timing phases, fore and aft with respect to an initial tap phase, thereby the initial synchronization acquisition including the synchronization tracking of the propagation path characteristics estimation which is used in the rake is performed to adjust the timing phase followed by performing the synchronization tracking of the symbol synchronization, the code synchronization and the clock synchronization.

Figure 5:
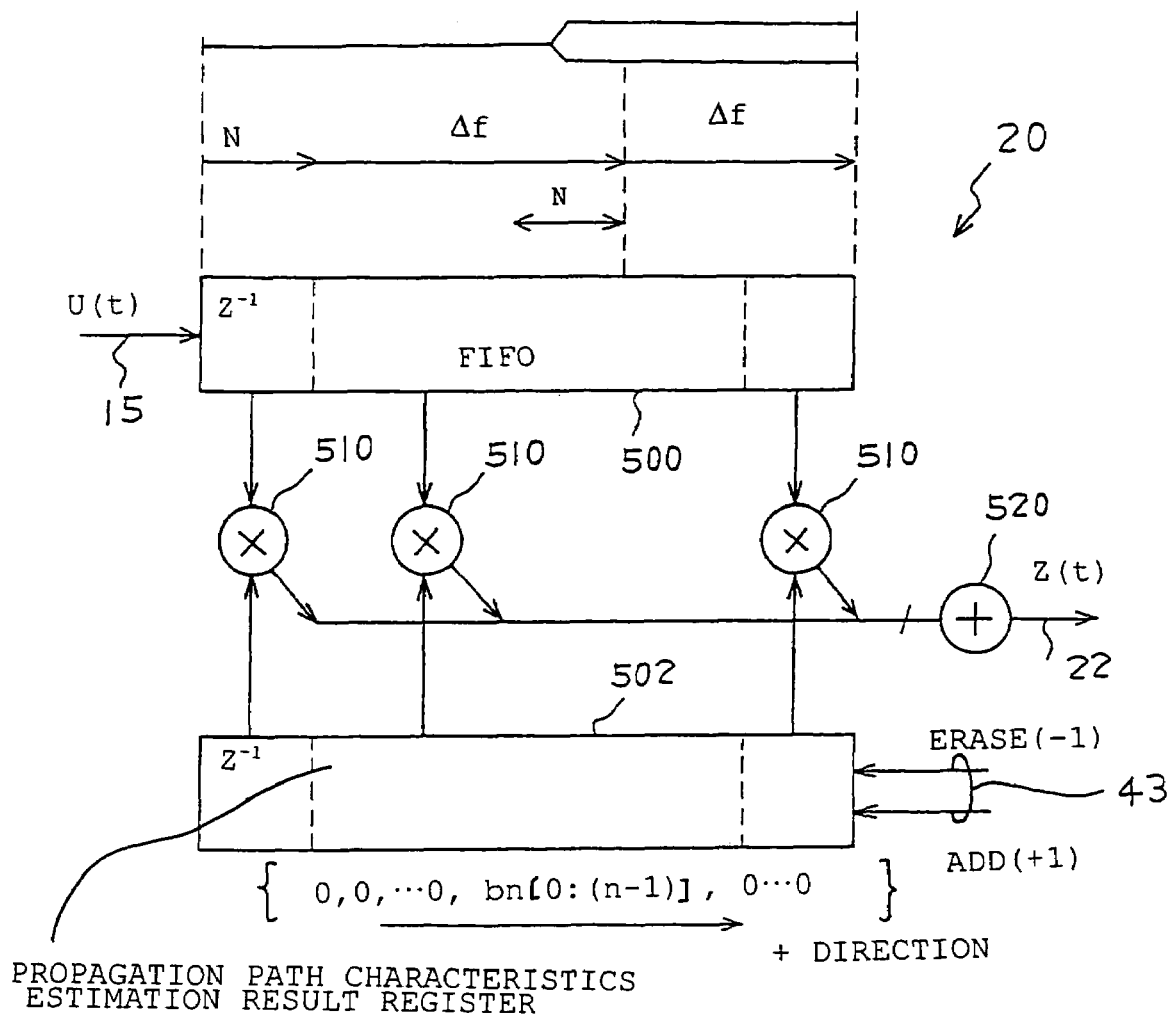
FIG. 5 is a block diagram showing an example of configuration of a channel matched filter (CMF)

In the channel matched filter (CMF) circuit 20, as shown in FIG. 5, a received signal outputted from the AD converter is inputted in the FIFO 500, and timing phases ("add", "erase" 43) outputted from the symbol timing recovery circuit 42 are inputted in a propagation path characteristics estimation result register 502. Outputs of the respective taps of the FIFO 500 and the propagation path characteristics estimation result register 502 are multiplied respectively in multipliers 510 and the respective multiplication results are moving average added by an adder 520.

Thus, with a timing phase supplied from a symbol timing recovery circuit, a propagation path characteristics estimation result is shifted fore and aft with respect to an initial tap phase by a register, and thereby the synchronization of the propagation path characteristics estimation result which is used in the rake, the symbol synchronization, the code synchronization and the clock synchronization are performed.

As a result, since in the correlation circuit 28, signals compensated in the multi-phasing and removed of the interference between chips and the interference between symbols are inputted, high precision correlation results can be outputted and high precision synchronization can be provided.

Figure 7:
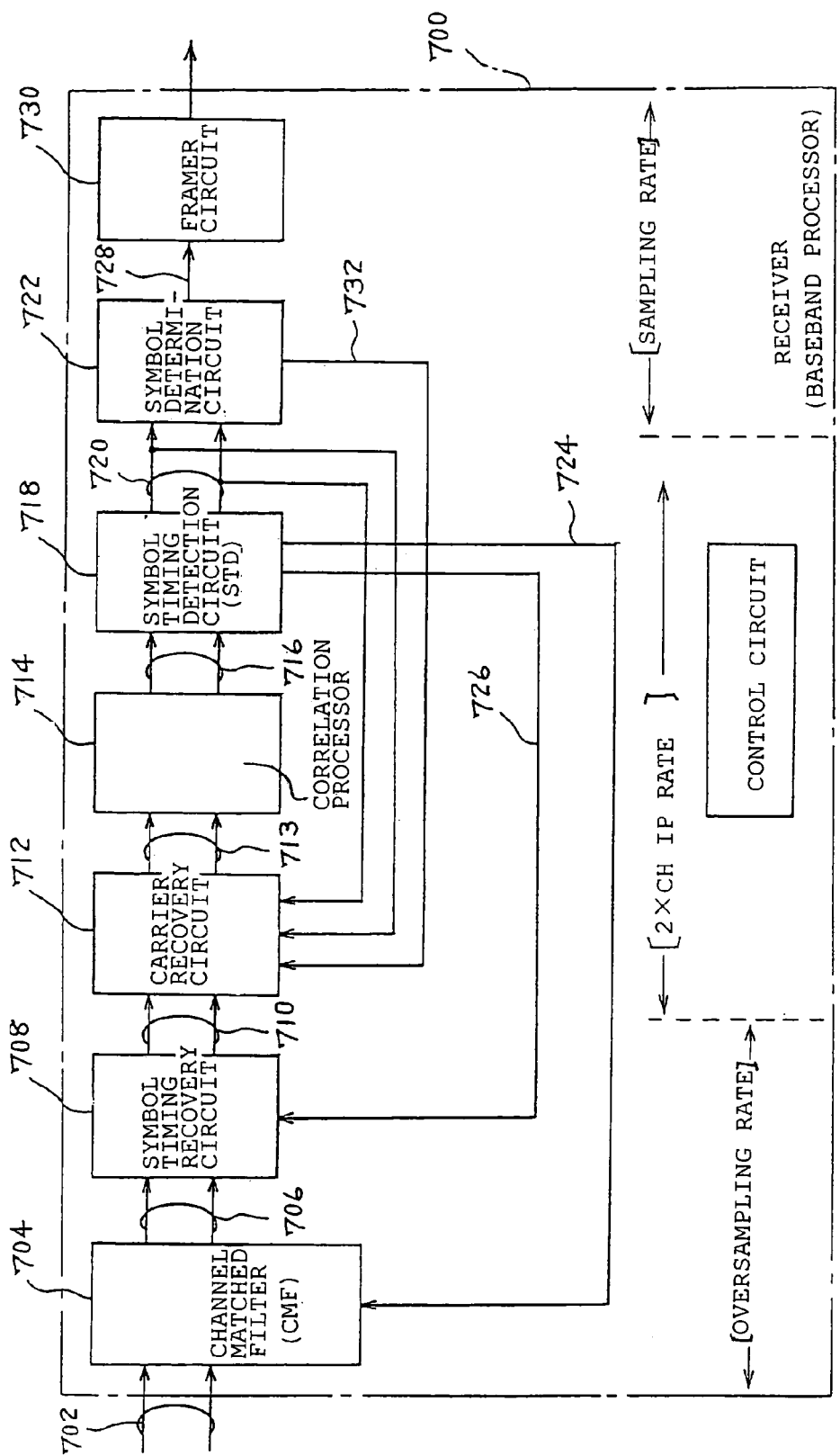
FIG. 7 is a block diagram showing anther example of configuration of a baseband processing section of a receiver to which the invention is applied.

Next, another example of configuration of a receiver will be explained with reference to FIG. 7. When referring to the drawing, a baseband processor of a receiver 700 which performs direct-sequence spread spectrum communication is shown. The receiver 700 includes a channel matched filter (CMF) circuit 704 which is connected to an output 702 of an analog/digital (AD) converter (not shown) and performs rake combining on received signals inputted to the input 702. The CMF circuit 704 may have a configuration similar to that of the CMF circuit 20 shown in, for instance, FIG. 2, and includes a FIFO memory circuit and a training circuit.

An output 706 of the CMF circuit 704 is connected to a symbol timing recovery circuit 708. The symbol timing recovery circuit 708 performs symbol synchronization, code synchronization and clock synchronization to the Rake combined output results. An output 710 of the symbol timing recovery circuit 708 is connected to a carrier recovery circuit 712. The carrier recovery circuit 712 removes a frequency offset of a carrier wave.

An output 713 of the carrier recovery circuit 712 is connected to a correlation processor 714. The correlation processor 714 performs correlation processing to carrier recovered Rake combined results to detect correlation for the direct-sequence spread spectrum communication (SS communication). An output 716 of the correlation processor 714 is connected to a symbol timing detection circuit 718.

The symbol timing detection circuit (STD) 718 performs the initial synchronization acquisition and the synchronization timing detection of symbol timings and thereby extracts symbols from the correlation results. An output 720 of the symbol timing detection circuit 718 is connected to a symbol determination circuit 722 and the carrier recovery circuit 712. Furthermore, an output 724 of the symbol timing detection circuit 718 is connected to the CMF circuit 704. The STD 718 connects an output of the correlation processor 714 to an output 726 and supplies early timing signals and late timing signals from the correlation processor 714 to the symbol timing recovery circuit 708.

The symbol determination circuit 722 regenerates data from the extracted symbols detected in the symbol timing detection circuit 718. One output 728 of the symbol determination circuit 722 is connected to a framer circuit 730 which discriminates, for instance, a PLCP format frame configuration from input data, the other output 732 being feedback-connected to the carrier recovery circuit 712.

Figure 8:
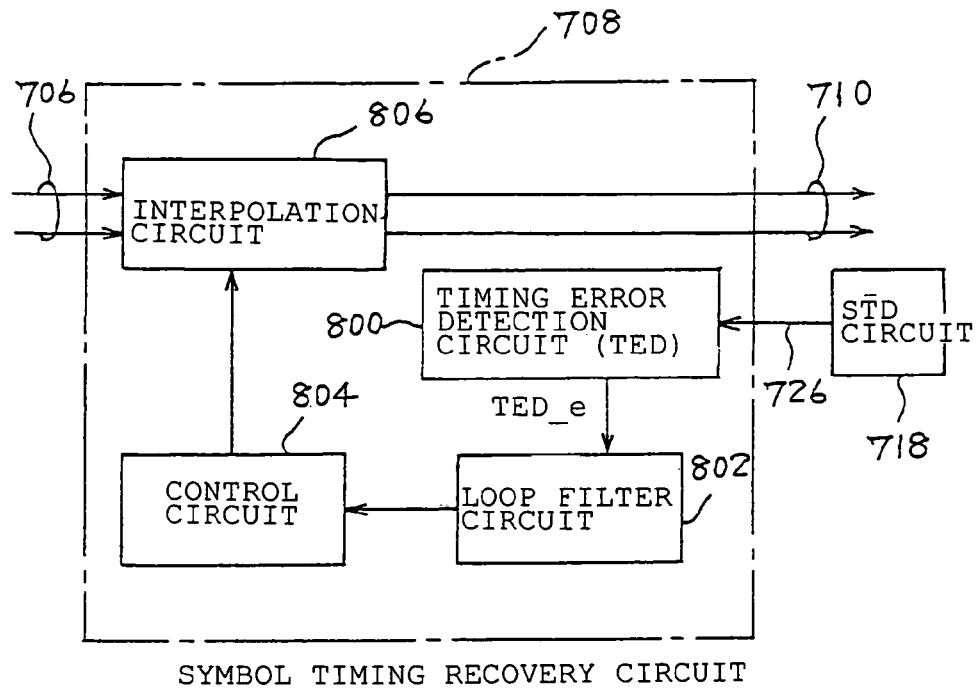
FIG. 8 is a block diagram showing an example of configuration of a symbol timing recovery circuit.

The symbol timing recovery circuit 708, as an example of configuration thereof is shown in FIG. 8, includes a timing error detection (TED) circuit 800 which, with extracted symbols detected by the symbol timing detection (STD) circuit 718 inputted at an input 726, detects a timing error amount (TED_e) for each of symbol timings; a loop filter circuit 802 which is connected to an output of the TED circuit 800, smoothes timing error amounts (TED_e) on a time axis, and outputs a smoothed timing error amount as a control amount; a control circuit 804 connected to an output of the loop filter circuit 802; and an interpolation circuit 806 which performs interpolation processing; wherein an output of the interpolation circuit 806 constitutes an output 710 of the symbol timing recovery circuit 708.

Figure 9:
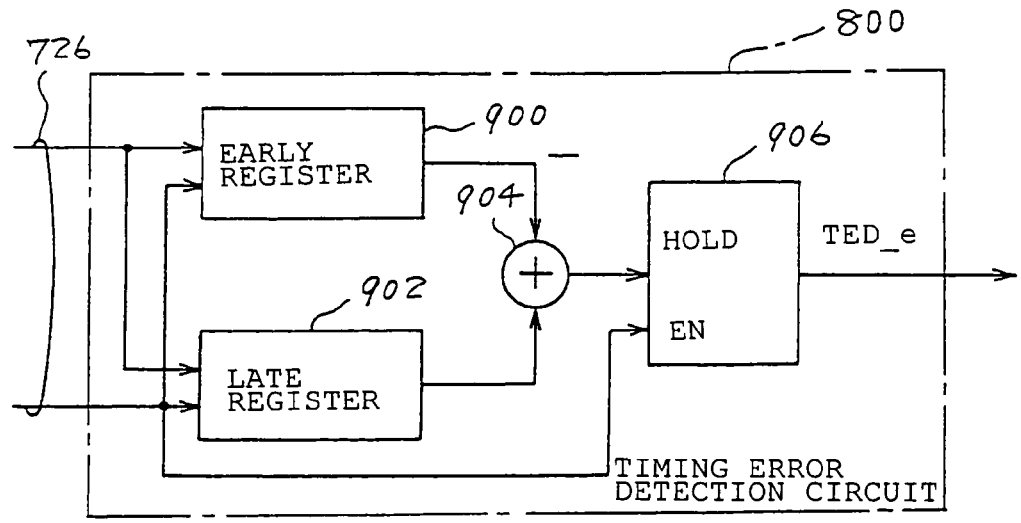
FIG. 9 is a block diagram showing an example of internal configuration of timing error detection circuit in a symbol timing recovery circuit shown in FIG. 8.

The TED circuit 800 is connected to an output 726 of the STD circuit 718 which relays and outputs an output 716 of the correlation processor 714, the output 726 thereof, as shown in FIG. 9, being connected to an early register 900 and a late register 902 which receive absolute values of correlation powers at a plurality of points of symbol synchronization timing phase separated by ±1/n (n; variable) from the symbol synchronization timing and perform in-phase addition of error amounts between a plurality of symbols. The respective outputs of the early register 900 and the late register 902 are connected to an adder 904. The adder 904 adds and calculates error amounts and outputs calculated results to a register 906. The register 906 retains error amounts which are outputted from the adder 904 based on symbol timings supplied from the STD circuit 718 and inputted in an input hold and supplies for each two symbols to the loop filter circuit 802 as the timing error amount (TED_e). With such configuration, result amounts after spectrum despreading in an oversampling phase are cancelled out each other between the symbols.

Returning to FIG. 8, the control circuit 804, based on control amounts supplied from the loop filter circuit 802, calculates values of the optimum estimation symbol timing phases which are used in the symbol synchronization, the code synchronization and the clock synchronization. An output of the control circuit 804 is connected to the interpolation circuit 806.

The interpolation circuit 806, with the Rake combining output result data outputted from the CMF circuit 704 inputted, based on the optimum estimation symbol timing phase values, performs the optimum estimation and outputs the optimum estimation Rake combining output result data to an output 710. The optimum estimation symbol timing phase values are ones which have 1/n chip clock phases. Here, when the symbol timing is expressed with "m", the number of the oversampling is expressed with "a" and a timing necessary for the synchronization is expressed with "α", in terms of clock unit, since the symbol timing becomes "am" and the chip timing is "1/a", "n" is n=α/a for a reference symbol timing.

Figure 10:
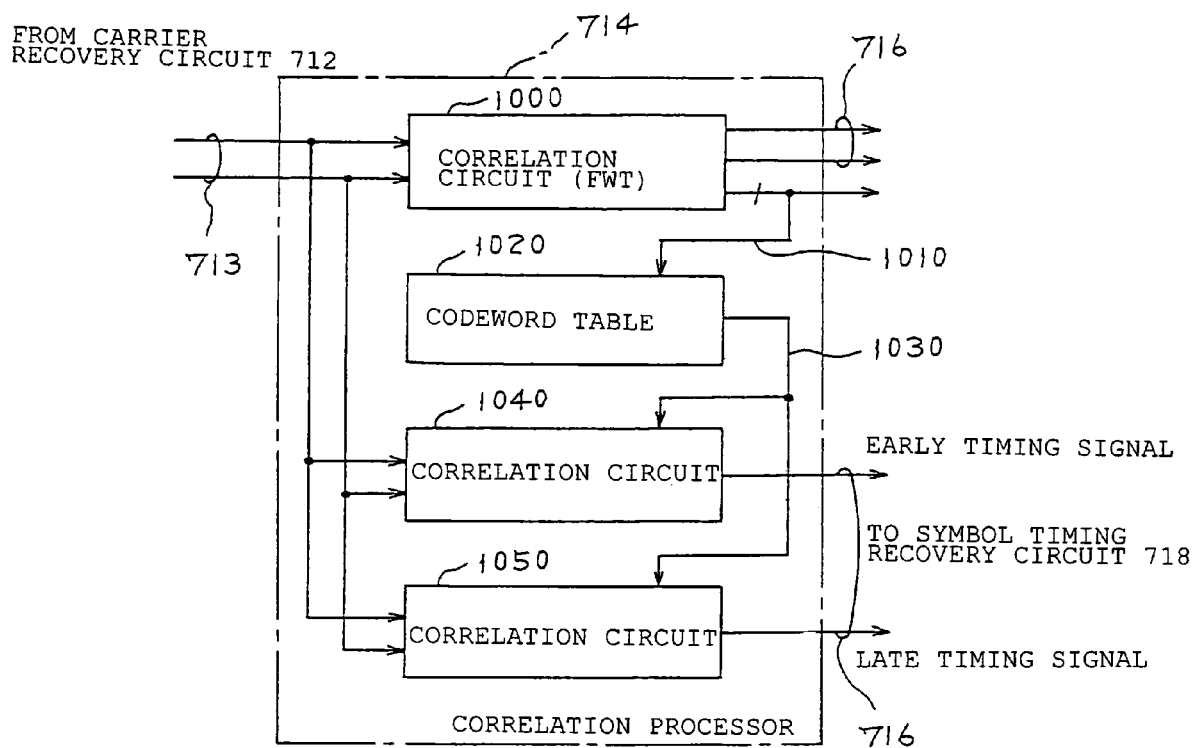
FIG. 10 is a block diagram showing an example of configuration of a correlation processor.

Returning to FIG. 7, the correlation processor 714 connected to the output 713 of the carrier recovery circuit 712 is a circuit which applies, to the carrier recovered Rake combining results, the correlation processing corresponding to CCK modulation (Complementary Code Keying) in a direct-sequence spread spectrum communication scheme. An example of an internal configuration of the correlation processor 714 is shown in FIG. 10.

As shown in the drawing, the correlation processor 714 includes a correlation circuit 1000 which, with the Rake combining results inputted, calculates correlation results at the symbol synchronization timings. The correlation circuit 1000 includes a fast Walsh transformation (FWT) circuit and outputs peak phases and peak powers to the output 716. The output 716 is connected to the symbol timing detection circuit 718 (FIG. 7). Furthermore, the correlation circuit 1000 outputs the correlation results of the input signals to an output 1010. The output 1010 of the correlation circuit 1000 is connected to the symbol determination circuit 722 (FIG. 7) and a codeword table 1020.

The codeword table 1020, a table which selects and outputs a codeword corresponding to the correlation result, is provided with codewords as shown in, for instance, FIGS. 11 and 12 and outputs codewords c0 through c7 corresponding to input phases φ2 through φ4 to an output 1030. The output 1030 of the codeword table 1020 is connected to two correlation circuits 1040 and 1050, respectively.

The correlation circuits 1040 and 1050 each are circuits which, with the codewords c0 through c7 calculated in the codeword table 1020, calculate correlation powers at a plurality of points of the ±1/n (n: variable) symbol synchronization timing phases. One correlation circuit 1040 outputs early timing signals in accordance with input signals, and the other correlation circuit 1050 outputs late timing signals in accordance with input signals. The correlation circuits 1040 and 1050 each are constituted of, for instance, a matched filter (MF) and I & D (integrate and damp) filter. The configuration of the correlation processor 714 shown in FIG. 10 can be applied as a configuration of the correlation circuit 28 shown in FIG. 1.

When an operation of the baseband processor 700 in a receiver is explained with the configuration like this, a received signal outputted from an external AD converter is inputted in a channel matched filter (CMF) circuit 704 at the foremost stage and rake combined therein, on the basis of the Rake combining results the symbol timing recovery circuit 708 removes a frequency offset of the carrier wave, and symbol synchronization, the code synchronization and the clock synchronization are performed.

Thus carrier recovered Rake combining result outputs are inputted in the correlation processor 714 and the correlation processing of the direct-sequence spread spectrum communication is implemented. The correlation results generated by the correlation processor 714 undergo the initial synchronization acquisition and the synchronization timing detection of the symbol timings in the symbol timing detection circuit 718, and symbols are extracted based on the correlation results. The symbol determination circuit 722 regenerates data from the extracted data, and the framer circuit 730 discriminates a frame configuration from the output data of the symbol determination circuit 722.

In the symbol timing recovery circuit 708, as shown in FIG. 8, at the timing error detection circuit 800, a timing error amount (TED_e) for each of symbol timings is calculated. In the early register 900 and the late register 902 in the timing error detection circuit 800, absolute values of the correlation powers at a plurality of points of the symbol synchronization timing phase ±1/n (n: variable) apart from the symbol synchronization timing are inputted from the correlation processor 714 through the STD circuit 718, and these input values are subjected to the in-phase addition operation between the plurality of symbols in the early register 900 and the late register 902. The respective outputs of the early register 900 and the late register 902 are further added by the adder 904, and the addition results are retained for each two symbols in the register 906 and outputted to the loop filter circuit 802 as the timing error amount (TED_e).

When error amounts are thus processed according to the in-phase addition between a plurality of symbols, result amounts after direct-sequence spectrum despreading in the oversampling phase are alternately cancelled out between the symbols; accordingly, occurrence frequency of controls occurring according to the error amount can be reduced.

The timing error amounts (TED_e) are inputted in the loop filter circuit 802 and smoothed on a time axis. With the smoothed error amounts (TED_e) as control amounts, the control circuit 804 calculates the optimum estimation symbol timing phase which is used in the symbol synchronization, the code synchronization and the clock synchronization. In the interpolation circuit 806, based on the optimum estimation symbol timing phase value calculated in the control circuit 804, the optimum estimation Rake combining output result data is generated from the Rake combining output result data from the channel matched filter 704 and outputted.

Thus, the Rake combining output results from the channel matched filter 704 are inputted, without applying downsampling, in the interpolation circuit 806; 1/n chip clock phases are outputted according to the downsampling in the interpolation followed by performing the symbol synchronization, the code synchronization and the clock synchronization; an output of the symbol timing recovery circuit 708 is inputted in the carrier recovery circuit 712; and in the carrier recovery circuit 712 the frequency offset of the carrier wave is compensated. Accordingly, signals in which the multi-phasing, the interference between chips and the interference between the symbols are compensated or removed are inputted into the correlation processor 714 which performs the correlation processing of the direct-sequence spread spectrum communication. As a result, the correlation processor 714 can output high precision correlation results.

In the correlation processor 714, as shown in FIG. 10, an output of the carrier recovery circuit 712 is inputted in the correlation circuit 1000 which has the fast Walsh transformation circuit, the correlation results at symbol synchronization timings are calculated and codewords corresponding to the correlation results are obtained from the code word table 1020. In the correlation circuits 1040 and 1050, from the input signals, correlation power results at a plurality of points of the ±1/n (n: variable) symbol synchronization timing phases are calculated with the codewords. Thus, a configuration which detects a CCK modulation adapted early/late/gate type symbol synchronization timing can be obtained; accordingly, in the correlation processor 714, without furnishing a plurality of fast Walsh transformation circuits, a circuit scale can be reduced.

The invention has been described with reference to the preferred embodiments thereof. It should be understood by those skilled in the art that a variety of alterations and modifications may be made from the embodiments described above. It is therefore contemplated that the appended claims encompass all such alterations and modifications.

This application is based on Japanese Patent Application No.2003-340824 which is hereby incorporated by reference.

What is claimed is:

1. A receiver which receives a direct-sequence spread spectrum signal, the receiver comprising:
   channel-matched-filter means, which is provided in the foremost stage and connected to an output of a converter converting the spread spectrum signal into a digital received signal, for performing Rake combining to the received signal to output a Rake combining result, the channel-matched-filter means including a memory having a capacity of a clock tracking amount for symbol synchronization;
   carrier recovery means which is connected to an output of the channel-matched-filter means and removes an offset of a carrier wave from the Rake combining result;
   correlation means which is connected to an output of the carrier recovery means and detects correlation of the spread spectrum communication for the Rake combining result from which the offset of carrier wave is removed;
   symbol detection means for extracting a symbol based on a correlation result detected by the correlation means;
   symbol determination means for regenerating data from the symbol extracted by the symbol detection means;
   frame discrimination means for discriminating a frame configuration from the data regenerated by the symbol determination means; and
   symbol timing recovery means for calculating a timing error amount for each of symbol timings to output a timing phase corresponding to the timing error amount to the channel-matched-filter means;
   wherein the channel-matched-filter means, in accordance with a first feedback from the symbol detection means, performs multi-phasing compensation for the received signal, and in accordance with the timing phase supplied by a second feedback from the symbol timing recovery means, performs symbol synchronization, code synchronization and clock synchronization to the received signal; and
   the carrier recovery means, in accordance with a third feedback from the symbol detection means, compensates a frequency offset of the carrier wave from the Rake combining result.

2. The receiver according to claim 1, wherein the symbol timing recovery means includes:
   timing error detection means for calculating a timing error amount for each of the symbol timings;
   loop filter means for smoothing the timing error amount on a time axis to output a smoothed value as a control amount; and
   divider means for generating, based on the control amount from the loop filter means, a timing phase which is used in symbol synchronization, code synchronization and clock synchronization to output the timing phase to the channel-matched-filter means.

3. The receiver according to claim 2, wherein the timing error detection means includes:
   an early register and a late register each of which, with a correlation power detected by the correlation means inputted, retains absolute values of correlation powers at a symbol synchronization timing and a plurality of points of ±1/n (n: variable) symbol synchronization timings; and
   absolute value comparison means for comparing outputs of the early register and the late register to generate an error amount for reducing an error in a displacement detection of the symbol synchronization timing phase; and
   wherein the loop filter means are formed with a random walk filter to smooth an output of the absolute value comparison means on a time axis.

4. The receiver according to claim 1, wherein the channel-matched-filter means includes:
   a first FIFO memory which has a memory capacity of a clock tracking amount ±Δf and the number of taps in a tracking range N of estimated multi-path delay;
   a first propagation path characteristics estimation result register which has a back and forth shift function constituted of a propagation path characteristics estimation result in a tracking range N of estimated multi-path delay and all zeros in taps before and after that and has the number of taps of a memory capacity of ±Δf;
   first multiplication means for multiplying the respective tap outputs of the first FIFO memory and the first propagation path characteristics estimation result register; and
   first addition means for performing moving average calculation of multiplication result of the first multiplication means;
   wherein, in accordance with a timing phase supplied from the symbol timing recovery means, a retention value of the first propagation path characteristics estimation result register is shifted fore and aft relative to an initial tap phase to perform Rake combining, further followed by performing symbol synchronization, code synchronization and clock synchronization.

5. The receiver according to claim 1, wherein the channel-matched-filter means includes:
a second FIFO memory having a memory capacity of a clock tracking amount $\pm\Delta f$ and the number of taps in a tracking range N of estimated multi-path delay;
a second propagation path characteristics estimation register of a tracking range N of estimated multi-path delay;
a multiplexer which has the number of taps of a memory capacity of $N\pm\Delta f$, selects a portion of N phases from retention values of the second FIFO memory to input, and outputs the inputted values;
second multiplication means for multiplying the respective tap outputs of the multiplexer and the second propagation path characteristics estimation result register; and
second addition means for applying moving average calculation to multiplication results of the second multiplication means;
wherein, in accordance with a timing phase supplied from the symbol timing recovery means, the multiplexer is allowed to selectively outputting the retention values of the second FIFO memory by a portion of N phases; and
outputs of the multiplexer and tap outputs of the second propagation path characteristics estimation result register are multiplied by the second multiplication means to perform Rake combining, further followed by performing symbol synchronization, code synchronization and clock synchronization.

6. The receiver according to claim 1, wherein the correlation means includes:
a fast Walsh transformation circuit which is connected to an output of the carrier recovery means and calculates a correlation result at a symbol synchronization timing;
a codeword table for calculating a codeword from the correlation result; and
a correlation circuit which, with the codeword, calculates correlation power results at a plurality of points of $\pm 1/n$ (n: variable) symbol synchronization timing phases;
wherein correlation power amounts at a symbol synchronization timing and a plurality of points of $\pm 1/n$ (n: variable) symbol synchronization timing phases are calculated.

7. A receiver which receives a direct-sequence spread spectrum signal, the receiver comprising:
channel-matched-filter means which, with a digital received signal converted from the spread spectrum signal inputted, performs Rake combining to output Rake combining result;
symbol timing recovery means which is connected to an output of the channel-matched-filter means and performs, to the Rake combining result, symbol synchronization, code synchronization and clock synchronization;
carrier recovery means which is connected to an output of the symbol timing recovery means to remove a frequency offset of a carrier wave from the Rake combining result;
correlation means which is connected to an output of the carrier recovery means to detect correlation of the spread spectrum communication to the Rake combining result from which the frequency offset of carrier wave is removed;
symbol detection means for extracting a symbol based on the correlation result detected by the correlation means;
symbol determination means for regenerating data from the symbol extracted in the symbol detection means; and
frame discrimination means for discriminating a frame configuration from the data regenerated by the symbol determination means;
wherein the channel-matched-filter means, in accordance with a first feedback from the symbol detection means, performs multi-phasing compensation for the received signal;
the symbol timing recovery circuit, in accordance with a second feedback control from the timing detection means, generates a timing error amount and interpolates the Rake combining results with a control amount corresponding to the timing error amount to output an optimum estimation Rake combining result data to the carrier recovery means; and
the carrier recovery means, in accordance with a third feedback from the symbol detection means, compensates a frequency offset of the carrier wave.

8. The receiver according to claim 7:
wherein the symbol timing recovery circuit includes timing error detection means which generates the timing error amount, the timing error detection means including:
a first early register and a first late register each of which, with a correlation power detected by the correlation means inputted, retains absolute values of correlation powers at a plurality of points of a symbol synchronization timing phase which are $\pm 1/n$ (n: variable) apart from a symbol synchronization timing, and performs in-phase addition between a plurality of symbols;
first addition means which adds an output of the first early register and an output of the first late register to calculate an error amount; and
a first register which retains the error amount for each two symbols and generates the timing error amount.

9. The receiver according to claim 7:
wherein the symbol timing recovery circuit includes timing error detection means which generates the timing error amount, the timing error detection means including:
a second early register and a second late register each of which, with a correlation power detected by the correlation means inputted, retains absolute values of correlation powers at a symbol synchronization timing and a plurality of points of $\pm 1/n$ (n: variable) symbol synchronization timing phases, and performs moving average calculation between a plurality of symbols;
second addition means which adds an output of the second early register and an output of the second late register to calculate an error amount; and
a second register which retains the error amount for each two symbols and generates the timing error amount.

10. The receiver according to claim 7, wherein the correlation means includes:
a fast Walsh transformation circuit which is connected to an output of the carrier recovery means and calculates a correlation result at a symbol synchronization timing;
a codeword table which calculates a codeword from the correlation result; and a correlation circuit which, with the codeword, calculates correlation power results at a plurality of points of ±1/n (n: variable) symbol synchronization timing phases;

wherein correlation power amounts at a symbol synchronization timing and a plurality of points of ±1/n (n: variable) symbol synchronization timing phases are calculated.

11. A receiver comprising:

a channel-matched-filter which, based on a timing phase signal, performs multi-phasing compensation of a digitalized radio-frequency signal and generates a Rake combining result;

a carrier recovery circuit which removes a frequency offset of the Rake combining result;

a correlation circuit which carries out correlation processing of the Rake combining result from which the frequency offset is removed to generate a correlation result;

a symbol timing detection circuit which extracts a symbol from the correlation result; and a symbol timing recovery circuit which generates the symbol timing phase signal with the extracted symbol.

* * * * *